United States Patent [19]

Lyon et al.

[11] 4,248,899

[45] Feb. 3, 1981

[54] PROTECTED FEEDS FOR RUMINANTS

[75] Inventors: Cameron K. Lyon, Orinda; George O. Kohler, El Cerrito, both of Calif.; David A. Dinius, Bowie, Md.

[73] Assignee: The United States of America as represented by the Secretary of Agriculture, Washington, D.C.

[21] Appl. No.: 15,491

[22] Filed: Feb. 26, 1979

[51] Int. Cl.$^3$ .......................... A23K 1/14; A23K 1/18
[52] U.S. Cl. ..................................... 426/98; 426/635; 426/636; 426/655; 426/807
[58] Field of Search ............... 426/655, 635, 636, 807, 426/2, 98

[56] References Cited

U.S. PATENT DOCUMENTS

| | | | |
|---|---|---|---|
| 3,137,631 | 6/1964 | Soloway | 426/98 |
| 3,925,560 | 12/1975 | Scott et al. | 426/98 |

FOREIGN PATENT DOCUMENTS 106543  6/1974  Fed. Rep. of Germany ............ 426/98

OTHER PUBLICATIONS

Lyon et al., "In Vitro Evaluation of Protected Feeds for Ruminants from Alfalfa Protein & Safflower Oil," J. Am. Sci., vol. 42, 1976, pp. 524–528.

*Primary Examiner*—R. B. Penland
*Attorney, Agent, or Firm*—M. Howard Silverstein; David G. McConnell; Theodore J. Leitereg

[57] ABSTRACT

Improved feed supplements for ruminants are prepared from protein from a leafy green source. The protein is combined with lipid material and the mixture is emulsified and coagulated. The coagulate is separated and dried to a solids content of about 85% or more at a temperature of about 80°–110° C.

7 Claims, No Drawings

PROTECTED FEEDS FOR RUMINANTS

BACKGROUND OF THE INVENTION

1. Field of the Invention

This invention relates to and has among its objects the provision of novel products for ruminant feed and methods for making them. It is a particular object of the invention to provide dietary supplements which will be more efficiently used by ruminant animals than conventional supplements. Another object of the invention is the provision of high-energy dietary supplements which allow ruminant animals to be fed greater than 5% fat without digestive disturbances. It is a further object of the invention to provide improved dietary substances which will ultimately result in production by the ruminants of meat, milk, and other materials low in saturated fats. Other objects of the invention will be evident from the following description wherein parts and percentages are by weight unless otherwise specified.

2. Description of the Prior Art

Most of the protein fed to cattle is hydrolyzed and deaminated in the rumen. The ammonia formed is used in the synthesis of bacterial protein in the rumen. It is this bacterial protein which is then digested and its amino acids absorbed in the abomasum and small intestine, so that the quality of the protein digested is not directly related to the quality of the protein fed. It is known that, if the feed protein is treated with formaldehyde, it is not broken down in the rumen which is at a pH of 6–7. However, in the acid environment of the abomasum, formaldehyde is split off and the protein is digested. In this way, most of the essential amino acids in a high quality feed may be absorbed by the animal, leading in some cases to improved feed efficiency.

It has also been demonstrated that ruminants fed high-energy feed supplements, i.e., those containing a high proportion of fats, require less feed per pound of gain than cattle fed a control diet. However, feeds that contain large amounts of fats disturb ruminal digestion. Thus, dietary supplements for ruminants generally are low (about 5% or less) in fat content.

In ruminants the body and milk fats are very low in polyunsaturated fatty acids because these fatty acids in feeds are reduced to more saturated fatty acids in the rumen. Meat and milk products with a higher proportion of polyunsaturated fats are of interest because there is considerable medical evidence that increasing the ratio of polyunsaturated to saturated fats in food tends to lower blood serum cholesterol and thereby reduce the risk of heart and circulatory disease in man.

Attempts have been made to modify the composition of rumen body fats by feeding the animals polyunsaturated oils and fats, such as vegetable oils. For the most part these attempts have proven unsuccessful. In U.S. Pat. No. 3,925,560 (hereinafter referred to as 3,925,560) there is disclosed a method of improving the utilization of lipid materials by ruminants. In the patented method ruminants are fed a supplement comprising a lipid encapsulated with a protein-aldehyde reaction product. In accordance with the 3,925,560 process an emulsion of lipid and protein in aqueous solution is formed and then traced with an aldehyde. An intermediate drying step may be used. Alternatively, the lipid and protein can be combined as separate components in any suitable encapsulation method known in the art with the protein being treated with aldehyde either before or after encapsulation.

Protected feeds for ruminants are also described by Lyon et al. in the *Journal of Animal Science*, Vol. 42, No. 2, pp. 524–528 (1976). Safflower oil was emulsified with freshly pressed alfalfa juice. The emulsion was coagulated by heating to 80° C. or by adjusting the pH to 3.5 at room temperature. The coagulated material was mixed with formaldehyde, held for one day, and then dried at 50° C.

The methods of 3,925,560 and Lyon et al. are disadvantageous because they necessitate the employment of an aldehyde to protect the encapsulated lipid material. Thus, the cost of the feed supplement is increased not only because of the added expense of the aldehyde itself but also because of the expense of the added operation of treating with aldehyde. A further disadvantage is that not all the protein-aldehyde complex is broken down in the abomasum, thus reducing the efficiency of the feed supplement.

SUMMARY OF THE INVENTION

The invention described herein provides means for obviating the above-mentioned problems. In the method of the invention leaf protein is combined with lipid material and the mixture is emulsified and coagulated; the coagulate is collected and heated at a temperature of about 80°–110° C. to raise its solids content to 85% or more.

The product of the invention is resistant to microbial hydrogenation and protein digestion by ruminal field. Thus, the dietary protein is digested in the abomasum, so that most of the essential amino acids may subsequently be absorbed by the animal. Furthermore, polyunsaturated fatty acids are not reduced in the rumen to saturated fatty acids.

A primary advantage of the instant method and product is that it does not require addition of aldehyde, tannin, or other crosslinking compounds. The protein and lipid material is protected by the process of the invention. A simple drying step above 80° C. is all that is necessary to make the protein-lipid complex resistant to degradation by ruminal fluid. Thus, the present method is more economical than the known methods.

DESCRIPTION OF THE PREFERRED EMBODIMENTS

The process of the invention is next described in detail using alfalfa as an exemplary source of leaf protein. Reference to this particular material is, however, made by way of illustration, not limitation. In its broad ambit the invention is applicable to leafy green crops in general, for example, grasses, lespedeza, clover, alfalfa, and similar conventional forages, and other leafy green vegetable materials such as lettuce, cabbage, kale, pea, or bean vines, celery tops, beet tops, and the like, grown deliberately for animal feeding or available as wastes or byproducts from food packaging or processing establishments.

In the first step of the process of the invention the leafy green vegetable material is treated to obtain a juice containing proteins therefrom. Thus, alfalfa, either whole, chopped, or ground may be subjected to pressing, squeezing, and the like to dejuice it. For example, chopped alfalfa may be expressed in a twin-screw press or passed through a series of rollers; the primary aim being to secure as much juice as possible. The pH of the juice is then adjusted to 6.0 to 9.0 by addition of an appropriate amount of an alkalizer, e.g., potassium or sodium hydroxide, ammonia, etc.

Following adjustment of the pH the juice is mixed with lipid material. Lipids may be defined as a group of naturally occurring substances consisting of the higher fatty acids, their naturally occurring compounds, and substances found naturally in chemical association with them. The group is characterized in general by insolubility in water and solubility in solvents such as ether, chloroform, benzene, and the like. The lipid group may be divided as follows: Simple lipids are esters of fatty acids with various alcohols and include fats, oils, and waxes. Compound lipids, i.e., compounds of fatty acids with alcohols and other groups, include phospholipids, glycolipids, and sulfolipids. Substances derived from compound lipids having the general properties of lipids are called derived lipids. Preferred in the process of the invention are simple lipids especially fats and oils such as vegetable oils including oils derived from safflowers, sunflowers, soya beans, peanuts, rape, maize, cotton seeds, etc., and animal fats or oils.

The alfalfa juice and lipid material are mixed together in the proportion of about 30 to 150 parts of juice to one part of lipid material. A small amount of antioxidant may be incorporated into the mixture to enhance the stability of the final product for storage purposes. The mixture is then emulsified by subjecting it to rapid high sheering action usually for a period of about ten seconds to five minutes.

Next, the emulsion is treated to coagulate the protein therein. Thus, the emulsion may be acidified to a pH of about 3 to 4 by addition of an acid such as hydrochloric, phosphoric, sulfuric, or the like to precipitate the protein. Alternatively, the emulsified material can be heated at a temperature of about 70°–100° C., preferably at 80° to 90° C., for a period of about 10 seconds or more. It is also within the compass of the invention to employ a combination of the aforementioned acidification and heating steps to coagulate the instant product.

After coagulation the so-treated complex is collected by conventional techniques such as centrifugation, filtration, and the like. Then, the complex is brought to a temperature of about 80° to 110° C., to dry it to a solids content of 85% or more. This drying step is carried out in a conventional manner using drying apparatus well-known in the art. The resultant product is now ready for incorporation into the diet of ruminant animals. The product is resistant to ruminal degradation and hydrogenation; thus, the proteins and fat are more efficiently utilized by ruminants.

It should be noted that the above-described drying step is critical to obtaining an improved feed supplement. Particularly, the drying must be carried out at a temperature within the range of 80°–110° C. Temperatures below 80° C. yield a product that is only minimally resistant to ruminal degradation and hydrogenation. A further point to be mentioned is that the wet bulb temperature of the coagulate must be raised to within the above critical range. In some known drying techniques the wet bulb temperature of the material to be dried is lower than the temperature of the drying medium. Thus, if those techniques are used in the present invention, care must be exercised to insure that the wet bulb temperature of the product is within the range of 80°–110° C. Finally, a temperature in the range of 80°–110° C. must be applied to the coagulate in the drying step; application of such temperatures in earlier steps in the above process does not afford benefits of the invention.

EXAMPLES

The invention is further demonstrated by the following illustrative examples.

EXAMPLE 1

Preparation of Improved Feed Supplement

Alfalfa (3600 kg) was expressed in a twin-screw press to yield 1800 liters of a juice having a 4% protein content (true protein content of 3%), which was filtered through a 40 mesh screen. About 5 ml of 20% sodium hydroxide per liter of juice was added to adjust the pH thereof to 8.5. A 250-ml aliquot of this juice was emulsified with 4.2 g of safflower oil in a high speed blender for a period of 5 minutes. The blended mixture was heated to 85° C. by direct steam injection to coagulate it. The oil came down quantitatively with the protein. The coagulated material was collected by filtration and dried at a temperature of 110° C. for 20 hours to a solids content of 99.9%.

EXAMPLE 2

In Vitro Evaluation of Improved Feed Supplement

Ruminal contents were removed via fistula from a steer fed a diet of 91.6% corn, grain cracked, gr 2 US, 4-02-915, 5% molasses, sugarcane, mn 48% invert sugar, 4-04-696 (nomenclature from N.A.S., 1971), 1.4% urea and 2% salt and mineral. The steer had been taken off feed for 19 hours and off water for 3 hours prior to removal of digesta. The digesta was strained through two layers of cheesecloth twice and the ruminal fluid was stirred constantly as 10 ml aliquots were added to 50 ml plastic centrifuge tubes containing 0.2 g of test material and 20 ml of buffer (Tilley et al., *J. Brit. Grassland Soc.*, Vol. 18, p. 104, 1963). The tubes were immediately sparged with carbon dioxide, capped with Bunsen valve outlets, swirled and placed in an incubating oven at 39° C. Samples were run in quadruplicate and eight tubes of ruminal fluid without substrates were included as controls with each incubation.

At the end of the 21-hour incubation, each tube was swirled and 1 ml of contents was withdrawn and analyzed for ammonia concentration as follows:

Fermentation was terminated by adding 0.4 ml saturated aqueous solution of mercuric chloride. The pH of flask contents generally ranged from 6.0 to 5.5 at the end of incubation. Since a very small percentage of ammonium ion is converted to ammonia gas below pH 7.5, essentially all ammonia hydrolyzed from the protein should have remained in solution. After setting about an hour, each flask was swirled and an aliquot of contents was withdrawn and diluted with 0.2 N sodium hydroxide. It was then analyzed for ammonia concentration with an ammonia electrode (Orion Research, Inc., Cambridge, Mass., model 95-10). The ammonia concentration of incubated ruminal fluid without substrate was subtracted from that of flasks containing substrate to determine net ammonia production, and net production was then expressed on a per gram sample basis.

After ammonia analyses the remaining flask contents of samples to be analyzed for lipid were freeze dried and extracted for 16 hours with ethyl ether. Approximately 50 mg of lipid was added to 8 ml of a 0.5% solution of concentrated sulfuric acid in methanol (V/V) for hydrolysis and methylation (Sink et al., *J. Animal Sci.*, Vol. 23, p. 121, 1964). The samples were placed in a 60° C. water bath for 4 hours and vigorously shaken at 15-minute intervals. After cooling, 1 ml of distilled water and 2 ml of petroleum ether were added to each sample and they were again vigorously shaken. The components were allowed to separate and 0.3 ml of the ether layer was injected into a chromatograph for analysis for the long-chain fatty acids.

The results are summarized in the following table. For purposes of comparison two products not in accordance with the invention were prepared. One product was prepared as described in Example 1 with the exception that the coagulated product was heated at 50° C. to dry it. The other material was formaldehyde treated material prepared according to the teaching of Lyon et al., *J. of Animal Sci.*, Vol. 42, No. 2, pp. 524–525 (1976). As a control the procedure of Example 1 was followed to obtain a coagulated product, which was subsequently freeze-dried to a solids content of 99.9%.

| Product | Ammonia nitrogen after incubation (% of nitrogen in original product)[b] | Reduction in ammonia[c] (%) | Fatty acids after incubation (%)[d] | |
|---|---|---|---|---|
| | | | Linolenic | Stearic |
| Invention (dried at 110° C.) | 5.4 | 77.9 | 4.78 | 14.8 |
| Formaldehyde-treated[a] | 3.0 | 87.7 | 4.97 | 16.3 |
| Dried at 50° C.[a] | 19.3 | 20.9 | 2.11 | 18.9 |
| Control[a] (freeze-dried) | 24.4 | 0 | 1.53 | 26.7 |

[a]Not in accordance with the invention but provided for purposes of comparison.
[b]Percent of nitrogen in original product converted to ammonia nitrogen by incubation in ruminal fluid; lower value indicates protection against degradation by ruminal fluid.
[c]Ammonia nitrogen from control minus ammonia nitrogen from product times 100 divided by ammonia nitrogen from control; higher value indicates protection against degradation by ruminal fluid.
[d]Higher values for linolenic acid, a polyunsaturated fatty acid, and lower values for stearic acid, a saturated fatty acid, indicate reduced hydrogenation of safflower oil by ruminal fluid. Values are percent by weight of $C_{14}$ to $C_{18}$ fatty acids.

Having thus described our invention, we claim:

1. A method of preparing a feed supplement for ruminant animals, which consists essentially of
   (a) pressing leafy green vegetable material to separate a juice therefrom,
   (b) mixing the juice of Step a with lipid material in a proportion of about 30 to 150 parts of juice to one part of lipid material,
   (c) emulsifying the mixture of Step b by subjecting it to rapid high shearing action for a period of about 10 seconds to 5 minutes,
   (d) coagulating the emulsified mixture of Step c by a method selected from the group consisting of (1) adjusting the pH of the mixture to about 3 to 4 by addition of an acid, (2) heating the mixture at a temperature of about 70°–100° C., and (3) adjusting the pH thereof to about 3 to 4 by addition of an acid and heating at a temperature of about 70°–100° C.,
   (e) separating a coagulate from the mixture of Step d, and
   (f) drying the coagulate of Step e at a temperature of about 80°–110° C. to a solids content of 85% or more.

2. The method of claim 1 wherein the leafy green vegetable material is alfalfa.

3. The method of claim 1 wherein the juice is combined with an alkalizer to adjust the pH thereof to about 6.0 to 9.0 prior to mixing with lipid material.

4. The method of claim 1 wherein the lipid material is polyunsaturated vegetable oil.

5. The method of claim 4 wherein the vegetable oil is safflower oil.

6. The method of claim 1 wherein the lipid material is saturated animal fat.

7. A feed supplement for ruminant animals prepared by the method of claim 1.

* * * * *

UNITED STATES PATENT AND TRADEMARK OFFICE
CERTIFICATE OF CORRECTION

PATENT NO. : 4,248,899

DATED : February 3, 1981

INVENTOR(S) : Cameron K. Lyon et al.

It is certified that error appears in the above—identified patent and that said Letters Patent is hereby corrected as shown below:

Column 1, line 65, cancel "traced" and insert --treated--.

Column 2, line 31, cancel "field" and insert --fluid--.

Signed and Sealed this

Twenty-eighth Day of April 1981

[SEAL]

Attest:

RENE D. TEGTMEYER

Attesting Officer          Acting Commissioner of Patents and Trademarks